United States Patent [19]
Shah et al.

[11] Patent Number: 6,153,680
[45] Date of Patent: Nov. 28, 2000

[54] THERMOPLASTIC POLYMER ALLOY COMPOSITIONS AND IN-LINE COMPOUNDING PROCESS FOR DIRECT SHEET EXTRUSION OF SHEETS PREPARED FROM THE THERMOPLASTIC POLYMER ALLOY COMPOSITIONS

[75] Inventors: Suresh Deepchand Shah, Troy; Srimannarayana Kakarala, Bloomfield Hills, both of Mich.; Jeanne E. Schneider, Hamilton, Ohio

[73] Assignee: Delphi Technologies, Inc., Troy, Mich.

[21] Appl. No.: 09/345,204

[22] Filed: Jun. 30, 1999

[51] Int. Cl.$^7$ ....................................... C08K 3/26
[52] U.S. Cl. ............................ 524/425; 525/185; 525/95; 525/97; 525/98; 525/55; 525/191; 525/208; 525/221; 525/222; 525/387; 264/177.2; 264/198; 524/451; 524/445; 524/449; 524/492
[58] Field of Search ................................ 525/185, 95, 97, 525/98, 55, 191, 208, 221, 222, 387; 264/177.2, 198; 428/904, 151; 524/425, 451, 445, 449, 492

[56] References Cited

U.S. PATENT DOCUMENTS 5,206,294  4/1993  Dawson .
5,721,314  2/1998  Hausmann .

*Primary Examiner*—Robert Dawson
*Assistant Examiner*—Kuo-Liang Peng
*Attorney, Agent, or Firm*—Kathryn A. Marra

[57] ABSTRACT

Thermoplastic polymer alloy compositions and a process for preparing the compositions are provided comprising a blend of polypropylene, uncrosslinked ethylene copolymer, ionomeric copolymer of ethylene and $\alpha,\beta$-unsaturated $C_3$–$C_8$ carboxylic acid, crosslinking agent, and silicone elastomer. The compositions may further comprise particulate filler, color concentrate and/or coloring pigment. The compositions are particularly useful for forming interior skin sheets for applications where low gloss and high scuff resistance are desired without the need for painting. A one step process for preparing moldable sheets from the thermoplastic polymer alloy compositions by in-line compounding and reactive extrusion is also provided which eliminates separate compounding and pelletizing processing steps as precursors to the sheet extrusion process.

38 Claims, 2 Drawing Sheets

THERMOPLASTIC POLYMER ALLOY COMPOSITIONS AND IN-LINE COMPOUNDING PROCESS FOR DIRECT SHEET EXTRUSION OF SHEETS PREPARED FROM THE THERMOPLASTIC POLYMER ALLOY COMPOSITIONS

TECHNICAL FIELD

The present invention relates to thermoplastic polymer alloy compositions, a process for producing such compositions and forming the compositions into thermoformable or castable sheets, and articles made therefrom.

BACKGROUND OF THE INVENTION

Thermoplastic polymer alloy compositions have been developed to replace polyvinyl chloride for the fabrication of many articles. In the automotive field, thermoplastic polymer alloy compositions have been used for the fabrication of articles such as interior sheathing, including instrument panel skins, door panels, air bag covers, roof liners, and seat covers.

For example, U.S. Pat. No. 5,206,294 discloses a blend of polypropylene, ethylene copolymer ionomer resin, ethylene glycidyl acrylate or methacrylate copolymer, and uncrosslinked ethylene propylene rubber. U.S. Pat. No. 5,721,314 discloses a blend of polypropylene, ethylene copolymer ionomer resin, ethylene glycidyl acrylate or methacrylate copolymer, uncrosslinked ethylene propylene rubber, acid or anhydride grafted polypropylene, an agent for crosslinking the rubber and/or catalyzing an epoxide/acid reaction, and optionally, a poly-α-olefin. These compositions provide some of the low temperature and high temperature resistance properties and scuff resistance that are desired in automotive interior sheathing applications. However, they exhibit a shiny, high gloss appearance that is objectionable in such applications, thus requiring painting to achieve an acceptable appearance.

Thermoplastic polymer alloy compositions currently available also do not provide sufficient scuff and scratch resistance properties. Therefore, current fabrication practice requires painting skins (sheets) of thermoplastic polymer alloys before thermoforming the desired article from the painted skins in order to provide adequate scuff and scratch resistance to the formed article. The painting process can be expensive with respect to both labor and materials.

The current fabrication process includes the steps of melt blending and pelletizing a thermoplastic polymer alloy composition. The formed pellets are then fed into an extruder to form sheets of the pellets. The processing steps continue with embossing the sheets, applying a primer on a bottom surface of the sheet, heat curing, applying a primer on a top surface of the sheet, heat curing again, applying a top coat and heat curing again. After this laborious process, the primed, painted sheets can then be used to form articles of manufacture such as interior vehicle sheathing.

There is a need in the art for a thermoplastic polymer alloy composition having improved scuff and scratch resistance, high melt strength, and low gloss and gloss uniformity after thermoforming, color match and retention of color over time. There is a further need in the art for an improved process for preparing such a composition possessing scuff and scratch resistance thus obviating the need for priming and painting processing steps. There is a further need for a composition having the capability to incorporate coloring pigments in order to obviate the need for painting of the exterior of articles formed from the composition.

SUMMARY OF THE INVENTION

Thermoplastic polymer alloy compositions and process for preparing same are provided comprising a blend of about 20 to about 40 weight percent (hereinafter "wt. %") polypropylene; about 20 to about 40 wt. % uncrosslinked ethylene copolymer; about 15 to about 45 wt. % ionomeric copolymer of ethylene and α,β-unsaturated $C_3$–$C_8$ carboxylic acid; about 1 to about 3 wt. % crosslinking agent; and about 0.5 to about 5 wt. % silicone elastomer, which silicone elastomer includes polydimethyl siloxanes.

Another embodiment further comprises particulate filler in an amount up to about 15 wt. %. In another embodiment, the composition further comprises at least one coloring pigment, and, optionally, UV stabilizers, in an amount effective to impart the desired color intensity and provide long term durability to the composition and article formed therefrom. In another embodiment, a process for the preparation of a thermoplastic polymer alloy composition is provided comprising melt blending about 20 to about 40 wt. % polypropylene; about 20 to about 40 wt. % uncrosslinked ethylene copolymer; about 15 to about 45 wt. % ionomeric copolymer of ethylene and α,β-unsaturated $C_3$–$C_8$ carboxylic acid; about 1 to about 3 wt. % crosslinking agent; and about 0.5 to about 5 wt. % silicone elastomer.

In another embodiment, the process comprises melt blending the foregoing compositions with one or a combination of color concentrate, up to about 15 wt. % particulate filler and/or an amount of coloring pigment or combination of coloring pigments effective to impart the desired color characteristics to the compositions. As used herein, color concentrate is a color concentrate-stabilizer combination comprising, for example, a combination of high and low molecular weight stabilizers and a coloring pigment in a carrier resin.

In another embodiment, the process comprises in-line compounding and extruding for direct sheet extrusion of sheets formed from the present thermoplastic polymer alloy compositions. The present process eliminates the separate processing steps of 1) off line melt blending the compositions and forming pellets therefrom, followed by 2) melting and extruding the pellets to form sheets.

In another embodiment, articles of manufacture prepared with the present compositions are provided.

These and other features and advantages of the present invention will be apparent from the following brief description of the drawings, detailed description, and appended claims and drawings.

BRIEF DESCRIPTION OF THE DRAWINGS

Referring now to the drawings, which are meant to be exemplary, not limiting.

DETAILED DESCRIPTION OF THE INVENTION

Figure 1:
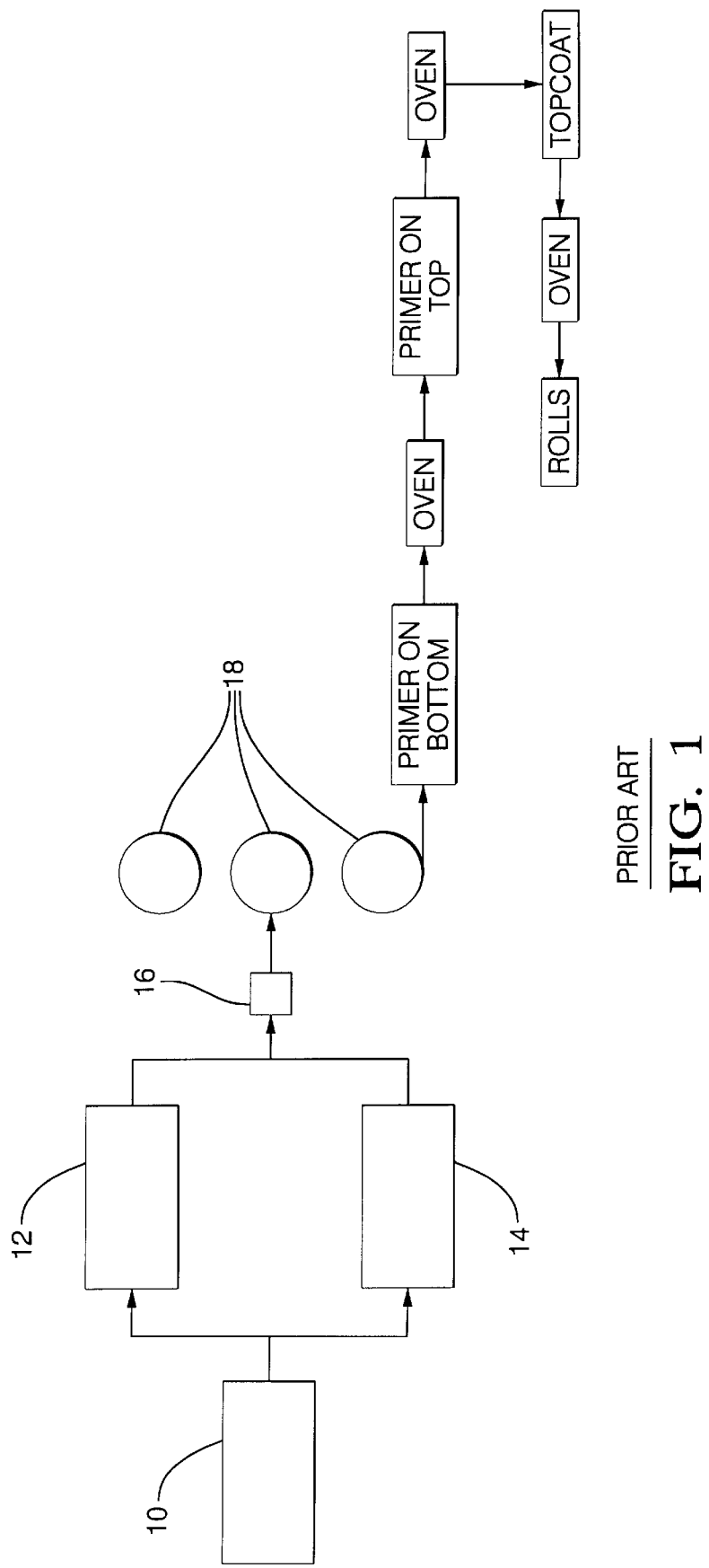
FIG. 1 is a schematic depiction of a prior art skin manufacturing process.

Described herein are thermoplastic polymer alloy compositions and a process for preparing the same. The present invention further relates to articles of manufacture prepared from the compositions. In one embodiment, a thermoplastic polymer alloy composition is disclosed comprising a blend of about 20 to about 40 wt. % polypropylene; about 20 to about 40 wt. % uncrosslinked ethylene copolymer; about 15 to about 45 wt. % ionomeric copolymer of ethylene and α,β-unsaturated $C_3$–$C_8$ carboxylic acid; about 1 to about 3 wt. % crosslinking agent; and about 0.5 to about 5 wt. % silicone elastomer, such as ultra high molecular weight polydimethylsiloxane (about 1 million molecular weight having a viscosity of 10–50 million cs) or medium molecular weight polydimethylsiloxane (less than about 100,000 molecular weight having a viscosity less than 1,000 cs.), or a combination thereof. Unless otherwise specified, wt. % as used herein means wt. % based on the combined total weight of the composition.

In another embodiment, the thermoplastic polymer alloy composition further comprises one or a combination of particulate filler in an amount up to about 15 wt. % and/or an amount of coloring pigment or combination of coloring pigments effective to impart the desired color characteristics to the compositions. Optionally, UV stabilizers and/or other agents may be incorporated in an amount effective to enhance color retention over time.

The polypropylene component of the thermoplastic polymer alloy compositions comprises crystalline polypropylene and is intended to include in addition to the homopolymer those polymers that also contain minor amounts, usually not greater than about 15 wt. % based on the total weight of the polypropylene, of higher α-olefins, e.g., those containing 3–8 carbon atoms, such as butene, octene, and the like. The polypropylene polymers useful in this invention have melt indices in the range of about 1 to about 400 grams/10 minutes (g/10 min.) measured at 230° C. employing a 2.16 kilogram (kg) weight. They are present in the alloy compositions in amounts of about 20 to about 40 wt. %, more preferably in amounts of about 15 to about 30 wt. %.

The thermoplastic polymer alloy compositions further comprise about 20 to about 40 wt. %, more preferably about 25 to about 35 wt. %, uncrosslinked ethylene copolymer. Suitable uncrosslinked ethylene copolymers include, but are not limited to, ethylene propylene rubber, ethylene butene rubber, and ethylene octene rubber. Preferably, an ethylene propylene non-conjugated diene copolymer (EPDM) is used. The non-conjugated dienes can contain about 6 to about 22 carbon atoms and have at least one readily polymerizable double bond. The uncrosslinked ethylene propylene copolymer rubber contains about 60 to about 80 wt. %, usually about 65 to about 75 wt. %, ethylene, based on the total weight of the EPDM. The amount of non-conjugated diene is generally about 1 to about 7 weight percent, usually about 2 to about 5 weight percent, based on the total weight of the EPDM. Preferably, the ethylene propylene copolymer rubbers are EPDM copolymers. EPDM copolymers that are especially preferred are ethylene propylene-1,4-hexadiene, ethylene propylene dicyclopentadiene, ethylene propylene norbornene, ethylene propylene-methylene-2-norbornene, and ethylene propylene-1,4-hexadiene/norbornadiene copolymers. These materials provide depth of draw and a soft touch feel to the compositions. EPDM copolymers are particularly preferred for providing grain retention (greater absolute depth after thermoforming).

The thermoplastic polymer alloy compositions comprise about 15 to about 45 wt. %, more preferably about 25 to about 35 wt. %, of an ionomeric copolymer of ethylene and α,β-unsaturated $C_3$–$C_8$ carboxylic acid. A preferred ionomeric copolymer is the sodium salt of ethylene-methacrylic acid copolymer or the zinc salt of ethylene-methacrylic acid copolymer. The ionomeric copolymer of ethylene and an α,β-unsaturated $C_3$–$C_8$ carboxylic acid imparts scuff resistance to the composition.

The thermoplastic polymer alloy compositions comprise about 1 to about 3 wt. %, preferably about 1 to about 2 wt. %, of a crosslinking agent which crosslinks at least the ionomeric copolymer of ethylene and α,β-unsaturated $C_3$–$C_8$ carboxylic acid. A preferred crosslinking agent is an epoxy functionalized ethylene copolymer, including, but not limited to, epoxy functionalized co-polymer (such as EPON® 828, available from Shell Corporation), and ethylene methyl acrylate glycidyl methacrylate terpolymer. The epoxy functionalized ethylene copolymer effects a high degree of entanglement and provides excellent scuff resistance, grain definition, grain retention, and melt strength.

In an alternate embodiment, a peroxide crosslinking agent may be used in place of the epoxy functionalized ethylene copolymer in an amount of about 1 to about 3 wt. %, more preferably about 1 to about 2 wt. %. Peroxide crosslinking agents suitable for use in the present compositions include, but are not limited to, dicumyl peroxide with a catalyst such as divinyl benzene (DVB). Free radical chain scavengers may also be added to reduce polypropylene depolymerization.

The thermoplastic polymer alloy compositions comprise about 0.5 to about 5 wt. % of a silicone elastomer, more preferably about 2 to about 4 wt. %, such as ultra high molecular weight polydimethyl siloxanes having a minimum molecular weight in the range of about 60,000 to about 1 million, medium molecular weight polydimethyl siloxanes having a molecular weight of less than about 100,000, or a combination thereof. These silicone elastomers may be added as a masterbatch with polypropylene or as a powder. If added as a powder, the powder can be further modified by attaching organo reactive sites thereto. The silicone elastomer may be modified with functional groups including, but not limited to, maleated or epoxy terminal functional groups. The silicone elastomers provide improved scuff resistance, mix well with other polymer systems, and provide excellent surface toughness properties, obviating the need for painting. These silicone elastomers also enlarge the extrusion process window by reducing the viscosity, therefore reducing the required mixing power (torque).

The present thermoplastic polymer alloy compositions further optionally comprise up to about 15 wt. % particulate filler. The particulate filler reduces the overall gloss and provides excellent scuff and scratch resistance. Particulate fillers suitable for use in the present compositions are low aspect ratio particulate fillers having a maximum dimension of about 30 to about 40 microns and a minimum dimension of about 1 to about 3 microns. Preferred particulate fillers include, but are not limited to, surface treated talc, calcium carbonate, mica, silica, and clay. The fillers can be nanocomposites based on laminated silicates or activated clays or mixture of both which imparts good surface finish and increased thermal stability and physical properties.

The present thermoplastic polymer alloy compositions further optionally comprise a coloring pigment or a combination of coloring pigments. Suitable coloring pigments are known in the art and the amount of coloring pigment is readily empirically determined based on the desired color characteristics of the finished article.

In a preferred embodiment, the present compositions comprise a color concentrate-stabilizer combination. For example, about 2 wt. % of a color concentrate-stabilizer combination comprising HALS (hindered amine light stabilizer) and pigment in a low molecular weight polypropylene carrier resin may be employed.

Optionally, various additives known in the art may be used as needed to impart various properties to the composition, such as heat stability, stability upon exposure to ultraviolet wavelength radiation, long term durability, and processability.

The thermoplastic polymer alloy compositions may be prepared by melt blending the components under high shear conditions, for example, in an extruder. The resultant compositions may be directly formed into sheets and molded into any desired shape. The compositions are particularly useful for thermoforming at high deep-draw ratios for use as instrument panel skins for automobiles.

In the present process, in-line thermoforming capability is facilitated due to the increased scuff and scratch resistance of the present compositions and the elimination of the need for multi-step priming, heating and painting of the skin formed therefrom. The present concurrent in-line compounding and reactive extruding to form the final sheet eliminates the step of pellet manufacturing. Elimination of this heating step reduces the need for heat stabilizers and other additives. Significant cost savings are realized by in-line compounding of the composition and thermoforming articles therefrom.

Turning now to the Figures, FIG. 1 is a schematic depiction of a prior art skin manufacturing process. In this prior art process, components of the thermoplastic polymer alloy composition are melt blended and pelletized to form pellets. In a separate step, the formed pellets are melted and extruded into thermoformable sheets. The components are precompounded in precompounding extruder 10 to form pellets. In a separate step, the formed pellets are coextruded with, for example, color pigment, through extruders 12 and extruder 14. The thermoplastic polymer alloy composition is passed through die 16 and embossing rollers 18 to form an embossed sheet. The remainder of FIG. 1 provides process steps following embossing rollers 18 for painting the formed sheets in order to provide the desired appearance, scuff and scratch resistance. In this painting process, a primer is applied to a bottom surface of the embossed sheet followed by heating in an oven. A primer is then applied to a top surface of the embossed sheet followed by heating in an oven. Following application of the primer coats, a topcoat is applied to at least one surface of the primer-coated sheet, followed again by heating. The embossed, painted skin is then transferred to rolls for forming articles therefrom.

Figure 2:
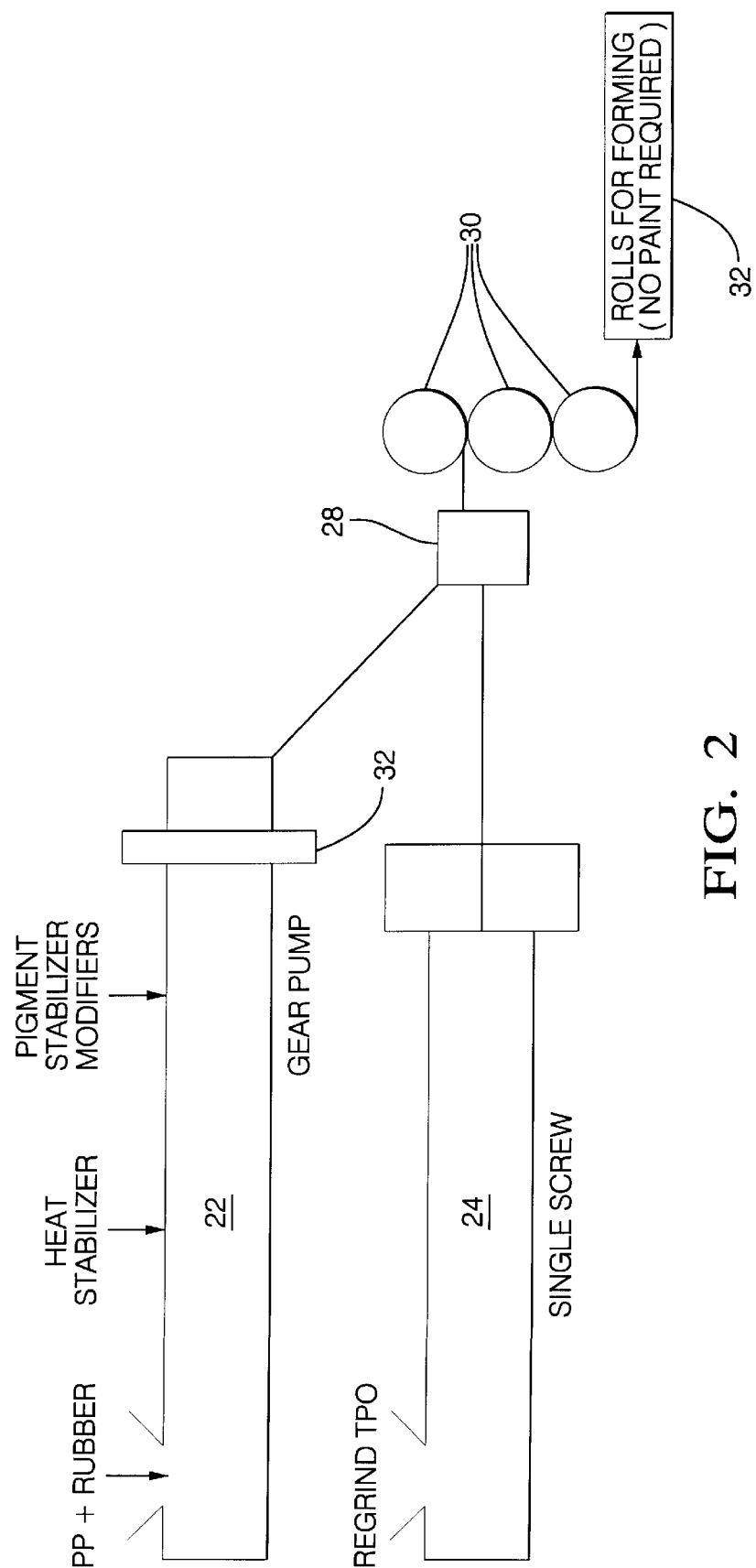
FIG. 2 is a schematic depiction of alternate embodiments of the present process for preparing sheets from the present thermoplastic polymer alloy compositions by in-line compounding and extrusion.

FIG. 2 is a schematic depiction of two alternate embodiments of the present process. As shown in FIG. 2, the components of the present composition may be compounded and coextruded through extruder 22 (which can be a twin screw or single screw extruder with a higher L/D (length of screw/barrel dianeter) ratio of greater than 28:1 with a special mixing device for both dispersive and distributive mixing). In an alternate embodiment, a composition regrind (precompounded composition) may be extruded through extruder 24. In either embodiment, extrudate (not shown) is passed from extruder 22 or extruder 24 through layer die 28 through embossing rollers 30. The formed sheets are transferred to rolls 32 for forming articles of manufacture therefrom. The present composition and process provide significant advantages in eliminating the need for expensive, time consuming priming, heating and painting steps.

The following examples illustrate specific thermoplastic polymer alloy compositions suitable for use with the above and other processes. Table 1 provides a list of components used in the present examples, along with tradename and sources for the components. It should be understood that the examples are given for the purpose of illustration and do not limit the invention. In the examples, all parts and percentages are by weight based on the total weight of the composition unless otherwise specified.

TABLE 1

| Component | Source | Tradename |
|---|---|---|
| Polypropylene | Amoco ®, Montell ®, Exxon ® etc. | E.g., Accpro ®, available from Amoco ® |
| Ethylene based non cross-linked elastomer (e.g. EPR, EOR, EBR) | DuPont-Dow Elastomers ® Exxon ® | Engage ® Nordel ® Exact ® Vistalon ® |
| Ionomer (Na or Zn based) | DuPont ® | Surlyn ® |
| Acrylate ter-polymer + +EMA-GMA* | Good Year ® Elf-Etochem ® | SuniGum ® Lotader ® |
| LLDPE (Linear Low Density Polyethylene) | Equistar ® | Plastolene ® |
| Epoxy functionalized ethylene co-polymer (cross-linking agent for ionomer) | DuPont ® Shell ® | ElvaloyAS ® Epon ® 828 |
| Peroxide crosslinking (e.g. Dicumyl peroxide) | Commercially available from many sources such as Elf-Etochem ® and Akzo Nobel Chemicals ® | Commodity material |
| Particulate fillers (surface treated talc, Calcium carbonate, Mica, Silica, and clay) | Specialty Minerals ® LuZenac ® PPG ® | Microtuff ® AG (talc) Cimpact ® 710 (treated talc) Hi-Sil ® (Silica) |
| Ultra High Molecular weight Polydimethyl siloxanes | Dow Corning ® | Master-batch or solid powder silicone additives |
| Heat and UV stabilizers and color pigments | Commercially available from many sources such as Ciba Specialty Chemicals ® Amreichem ® | Tinuine ® (UV stabilizer) Chemisorb ® (heat and UV stabilizer) Pigments |

*ethylene methacrylate-glycidyl methacrylate

The following compositions were prepared as set forth in Table 2, and processed into moldable sheets.

TABLE 2

| | Sample # (% by weight) Examples 2–5 (Invention, Paintless) | | | | |
|---|---|---|---|---|---|
| Component | 1 (control painted) | 2 | 3 | 4 | 5 |
| Polypropylene | 30 | 25 | 20 | 15 | 25 |
| Ethylene Propylene rubber | 45 | — | 30 | — | — |
| Ethylene octene rubber | — | — | — | 30 | — |
| Ethylene butene rubber | — | 30 | — | — | 30 |
| Ionomer | 25 | 45 | 50 | 55 | 45 |
| Epoxy | 2 | 2 | 3 | 3 | 2 |
| Dicumyl Peroxide | — | — | — | — | 1 |
| Talc | — | — | 10 | 5 | — |
| Silica | — | 5 | — | — | 5 |
| Clay | — | — | — | — | — |

TABLE 2-continued

Sample # (% by weight)
Examples 2–5 (Invention, Paintless)

| Component | 1 (control painted) | 2 | 3 | 4 | 5 |
|---|---|---|---|---|---|
| Ultra high molecular weight polydimethyl siloxane | — | 3 | 3 | 3 | 3 |
| Color concentrate* | 2 | 2 | 2 | 2 | 2 |

*Combination stabilizer consisting of HALS (Tinuine ® and Chemisorb ®) and pigment in a low molecular weight carrier resin.

TABLE 3

Properties

| Sample # | 1 (Control, painted) | 2 | 3 | 4 | 5 |
|---|---|---|---|---|---|
| Scuff Resistance | 1.8 | 1.9 | 2.0 | 1.9 | 1.8 |
| % Grain retention | 70 | 75 | 82 | 85 | 85 |
| Gloss | 3 | 1.5 | 2 | 2 | 2.5 |

The present compositions provide improved melt strength and grain retention. Surprisingly, the present combination of low aspect ratio fillers, silicone powder, and epoxy crosslinking result in an unexpected synergy of desirable properties for vehicle interior skins, which properties include low gloss, improved scratch resistance, and outstanding surface scuff resistance.

Specifically, scuff resistance, % grain retention, and gloss characteristics were evaluated for sample sheets prepared with the compositions of samples 1–5. Sample 1, the control, was prepared and painted according to the prior art process described herein. Samples 2–5 were in-line compounded and coextruded to form sample sheets according to the present process.

Scuff resistance for sheets prepared with the compositions of Examples 1–5 was evaluated using the conventional five finger scratch test.

% Grain retention was evaluated visually both before and after thermoforming. Numerical values were assigned to the sample surfaces on a scale of 1 to 100, with 100% being the greatest amount of grain and 1 % being the least.

Gloss was measured using a reflectometer (Byk-Gardner, Inc., Model Micro-TRI-Gloss) with a 60 ° viewing angle.

Table 3 provides scuff resistance, grain retention and gloss measurements. It can be seen that the present compositions provide the same or better scuff resistance, % grain retention, and gloss properties when compared with the control, without complex painting and processing steps.

The embodiments of the present compositions, process, and articles made therefrom, although primarily described in relation to vehicle applications such as interior sheathing, including instrument panel skins, door panels, air bag covers, roof liners, and seat covers, can be utilized in numerous applications, including, but not limited to, videotape cases, food packaging, and beverage containers, among others.

It will be understood that a person skilled in the art may make modifications to the preferred embodiments shown herein within the scope and intent of the claims. While the present invention has been described as carried out in specific embodiments thereof, it is not intended to be limited thereby but is intended to cover the invention broadly within the scope and spirit of the claims.

What is claimed is:

1. A composition for forming a thermoplastic polymer alloy comprising:
    (a) about 20 to about 40 wt. % polypropylene or copolymer thereof;
    (b) about 20 to about 40 wt. % uncrosslinked ethylene copolymer;
    (c) about 15 to about 45 wt. % ionomeric copolymer of ethylene and $\alpha,\beta$-unsaturated $C_3$–$C_8$ carboxylic acid;
    (d) about 1 to about 3 wt. % crosslinking agent; and
    (e) about 0.5 to about 5 wt. % silicone elastomer.

2. The composition of claim 1, further comprising up to about 15 wt. % particulate filler.

3. The composition of claim 1, further comprising at least one pigment.

4. The composition of claim 1, further comprising color concentrate.

5. The composition of claim 4, wherein the composition comprises about 2 wt. % color concentrate.

6. The composition of claim 1, further comprising color concentrate and up to about 15 wt. % particulate filler.

7. The composition of claim 1, wherein said uncrosslinked ethylene copolymer is selected from the group consisting of ethylene propylene rubber, ethylene butene rubber, ethylene octene rubber, ethylene propylene non-conjugated diene copolymer, ethylene propylene-1,4-hexadiene, ethylene propylene dicyclopentadiene, ethylene propylene norbornene, ethylene propylene methylene-2-norbornene, and ethylenepropylene-1,4-hexadiene/norbornadiene copolymers.

8. The composition of claim 1, wherein the ionomeric copolymer is selected from the group consisting of the sodium salt of ethylene methacrylic acid copolymer and the zinc salt of ethylene methacrylic acid copolymer.

9. The composition of claim 1, wherein the crosslinking agent is selected from the group consisting of epoxy functionalized ethylene copolymer crosslinking agents and peroxide crosslinking agents.

10. The composition of claim 9, wherein the peroxide crosslinking agent is dicumyl peroxide.

11. The composition of claim 1, wherein the silicone elastomer is selected from the group consisting of polydimethyl siloxane, ultra high molecular weight polydimethylsiloxane, medium molecular weight polydimethyl siloxane, silicone elastomer modified with organo-functional groups, epoxy terminated polydimethyl siloxane, maleated polydimethyl siloxane, and combinations thereof.

12. The composition of claim 2, wherein the particulate filler is selected from the group consisting of surface treated talc, calcium carbonate, mica, silica, and clay.

13. A process for preparing a thermoplastic polymer alloy comprising melt blending:
    (a) about 20 to about 40 wt. % polypropylene;
    (b) about 20 to about 40 wt. % uncrosslinked ethylene copolymer;
    (c) about 15 to about 45 wt. % ionomeric copolymer of ethylene and $\alpha,\beta$-unsaturated $C_3$–$C_8$ carboxylic acid;
    (d) about 1 to about 3 wt. % crosslinking agent; and
    (e) about 0.5 to about 5 wt. % silicone elastomer.

14. The process of claim 13, wherein the thermoplastic polymer alloy composition further comprises up to about 15 wt. % particulate filler.

15. The process of claim 13, wherein the thermoplastic polymer alloy composition further comprises at least one coloring pigment.

16. The process of claim 13, wherein the thermoplastic polymer alloy composition further comprises at least one coloring pigment and up to about 15 wt. % particulate filler.

17. The process of claim 13, wherein the thermoplastic polymer alloy composition further comprises color concentrate.

18. The process of claim 17, wherein the composition comprises about 2 wt. % color concentrate.

19. The process of claim 13, further comprising color concentrate and up to about 15 wt. % particulate filler.

20. The process of claim 13, wherein the uncrosslinked ethylene copolymer is selected from the group consisting of ethylene propylene rubber, ethylene butene rubber, ethylene octene rubber, ethylene propylene non-conjugated diene copolymer, ethylene propylene-1,4-hexadiene, ethylene propylene dicyclopentadiene, ethylene propylene norbornene, ethylene propylene methylene-2-norbornene, and ethylenepropylene-1,4-hexadiene/norbornadiene copolymers.

21. The process of claim 13, wherein the ionomeric copolymer is selected from the group consisting of the sodium salt of ethylene methacrylic acid copolymer and the zinc salt of ethylene methacrylic acid copolymer.

22. The process of claim 13, wherein the crosslinking agent is selected from the group consisting of epoxy functionalized ethylene copolymer crosslinking agents and peroxide crosslinking agents.

23. The process of claim 22, wherein the peroxide crosslinking agent is dicumyl peroxide.

24. The process of claim 13, wherein the silicone elastomer is selected from the group consisting of polydimethyl siloxane, ultra high molecular weight polydimethylsiloxane, medium molecular weight polydimethyl siloxane, silicone elastomer modified with organo-functional groups, epoxy terminated polydimethyl siloxane, maleated polydimethyl siloxane, and combinations thereof.

25. The process of claim 14, wherein the particulate filler is selected from the group consisting of surface treated talc, calcium carbonate, mica, silica, and clay.

26. An article of manufacture made from the composition of claim 1.

27. An article of manufacture made from the composition of claim 1, wherein the article of manufacture is selected from the group consisting of sheathing, instrument panel skins, airbag housing covers, and door trims.

28. An in-line compounding process for direct sheet extrusion of a thermoplastic polymer alloy composition comprising:

in-line compounding about 20 to about 40 wt. % polypropylene; about 20 to about 40 wt. % uncrosslinked ethylene copolymer; about 15 to about 45 wt. % ionomeric copolymer of ethylene and $\alpha,\beta$-unsaturated $C_3$–$C_8$ carboxylic acid; about 1 to about 3 wt. % crosslinking agent; about 0.5 to about 5 wt. % silicone elastomer; optionally, up to about 15 wt. % particulate filler; and, optionally, at least one coloring pigment; and directly extruding the in-line compounded thermoplastic polymer alloy composition to form sheets.

29. The process of claim 28, further comprising: embossing the sheets.

30. The process of claim 28, wherein the uncrosslinked ethylene copolymer is selected from the group consisting of ethylene propylene rubber, ethylene butene rubber, ethylene octene rubber, ethylene propylene non-conjugated diene copolymer, ethylene propylene-1,4-hexadiene, ethylene propylene dicyclopentadiene, ethylene propylene norbornene, ethylene propylene methylene-2-norbornene, and ethylenepropylene-1,4-hexadiene/norbornadiene copolymers.

31. The process of claim 28, wherein the ionomeric copolymer is selected from the group consisting of the sodium salt of ethylene methacrylic acid copolymer and the zinc salt of ethylene methacrylic acid copolymer.

32. The process of claim 28, wherein the crosslinking agent is selected from the group consisting of epoxy functionalized ethylene copolymer crosslinking agents and peroxide crosslinking agents.

33. The process of claim 32, wherein the peroxide crosslinking agent is dicumyl peroxide.

34. The process of claim 28, wherein the silicone elastomer is selected from the group consisting of polydimethyl siloxane, ultra high molecular weight polydimethylsiloxane, medium molecular weight polydimethyl siloxane, silicone elastomer modified with organo-functional groups, epoxy terminated polydimethyl siloxane, maleated polydimethyl siloxane, and combinations thereof.

35. The process of claim 28, wherein the particulate filler is selected from the group consisting of surface treated talc, calcium carbonate, mica, silica, and clay.

36. The composition of claim 28, further comprising color concentrate.

37. The process of claim 36, wherein the composition comprises about 2 wt. % color concentrate.

38. The process of claim 28, further comprising color concentrate and up to about 15 wt. % particulate filler.

* * * * *